June 30, 1942.  T. G. SADLER  2,288,574

METHOD OF FORMING A REAMER TAP

Filed Nov. 22, 1940

INVENTOR.
Thomas G. Sadler
BY Barlow & Barlow
ATTORNEYS.

Patented June 30, 1942

2,288,574

UNITED STATES PATENT OFFICE 2,288,574

METHOD OF FORMING REAMER TAPS

Thomas G. Sadler, Attleboro, Mass., assignor to Sadler Bros., Inc., a corporation of Massachusetts Application November 22, 1940, Serial No. 366,654

3 Claims. (Cl. 76—101)

This invention relates to a reamer tap of that type used by opticians for tapping joints of optical mountings or cleaning the same from particles of glass or other foreign matter and aligning the same just prior to placing of the securing screw in position; and has for one of its objects to simplify the procedure in forming a reamer tap.

Another object of the invention is to provide this improved reamer tap by an improved method, enabling the taps to be produced more efficiently and economically than heretofore.

Another object of the invention is to provide a reamer tap with fewer manual handling operations than has been customary in the formation of taps of this character.

With these and other objects in view, the invention consists of certain novel features of construction, as will be more fully described, and particularly pointed out in the appended claims.

Figure 1:
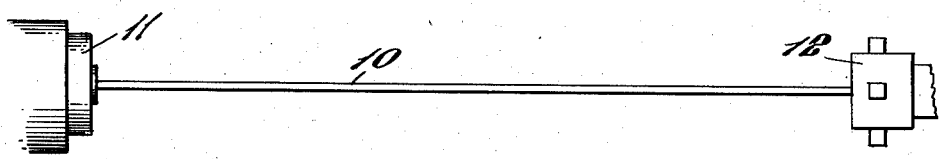
Fig. 1 illustrates a length of wire supported in position for having provided thereon a screw thread extending the entire length of the wire.
Figure 2:
Fig. 2 illustrates the wire after threaded and illustrates section lengths into which the wire is divided.
Figure 3:
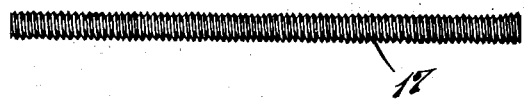
Fig. 3 shows one of the threaded sections.
Figure 4:
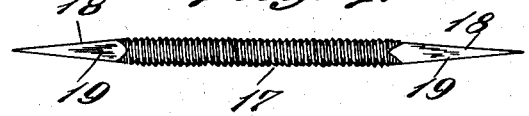
Fig. 4 illustrates the completed reamer tap after the pointed ends have been formed thereon.

Reamer taps which are used in the optical trade usually are found to wear out quickly due to the abrasive action of the particles of glass which collect in the opening in which the reamer is usually used in the optical trade. Such taps are of a given length of wire, one half of the wire being a plain, smooth surface and the other half being threaded and pointed in a pyramidal fashion to act as a reamer. This requires the cutting of the sections prior to threading and threading of part of the length and then pointing. In order to eliminate the handling of each tap for threading and also to provide a tap which will be more serviceable in that both ends may be utilized, I have effected an improved method of operation; and the following is a more detailed description of the present embodiment of this invention, illustrating the preferred means by which these advantageous results may be accomplished:

Fig. 1 illustrates a length of wire 10 which is held in a chuck 11 at one end while a die 12 is illustrated at the other end preparatory to the formation of threads upon the wire throughout its entire length. The threaded wire is designated 14 and after threaded for an extended length I sever the wire as at 15, 16 and so forth to provide sections 17 threaded throughout their length.

Then by suitably holding these sections and indexing the holding means to certain positions I grind a plurality of faces 18, 19 and so forth in pointing the sections 17 to provide reaming edges between the faces and causing a pyramidal shaping of the ends of the sections. In this manner I provide a reaming and tap portion at each end of the section thus providing two effective tools and thus provide for a double duty of the reamer tap and a tap which will last twice as long as the taps heretofore provided.

I claim:

1. The method of forming a reamer tap which consists in the continuous threading of a length of wire of the proper diameter for an extended length thereof, severing across the threads of the wire to form a section the desired length of the tap, and then pointing both ends of the severed section to form sharp angular reaming edges.

2. The method of forming a reamer tap which consists in the continuous threading of a length of wire of the proper diameter for an extended length thereof, severing across the threads of the wire to form a plurality of sections the desired length of the tap, and then pointing both ends of the severed sections in pyramidal fashion to form sharp angular reaming edges.

3. The method of forming a reamer tap which consists in the continuous threading of a length of wire of the proper diameter for an extended length thereof, severing across the threads of the wire to form a section the desired length of the tap, and then grinding the end portions in pyramidal fashion to provide points at the opposite ends of the sections.

THOMAS G. SADLER.